United States Patent
Nakayasu

(10) Patent No.: US 7,301,916 B2
(45) Date of Patent: Nov. 27, 2007

(54) NETWORK ACCESS CONTROL TECHNIQUE IN A CDMA SYSTEM

(75) Inventor: Kanada Nakayasu, Tokyo (JP)

(73) Assignee: NEC Corporation, Tokyo (JP)

( * ) Notice: Subject to any disclaimer, the term of this patent is extended or adjusted under 35 U.S.C. 154(b) by 924 days.

(21) Appl. No.: 10/440,096

(22) Filed: May 19, 2003

(65) Prior Publication Data

US 2003/0214931 A1 Nov. 20, 2003

(30) Foreign Application Priority Data

May 20, 2002 (JP) .............................. 2002-144693

(51) Int. Cl.
*H04B 7/216* (2006.01)
*H04Q 7/20* (2006.01)

(52) U.S. Cl. ..................... 370/320; 455/435.2
(58) Field of Classification Search ............... 370/230, 370/342, 462, 441, 335, 328, 329, 455, 278, 370/282, 252, 310.1, 310.2, 230.1; 455/509, 455/512–514, 450–452.2, 434, 435.1, 435.3; 379/190, 192
See application file for complete search history.

(56) References Cited

U.S. PATENT DOCUMENTS 5,729,542 A 3/1998 Dupont
6,873,694 B2 * 3/2005 Lipinski ................ 370/201.02

FOREIGN PATENT DOCUMENTS

| EP | 0 750 440 A2 | 12/1996 |
|---|---|---|
| EP | 0 913 968 A1 | 5/1999 |
| GB | 2 338 372 A | 12/1999 |
| WO | WO 00/14989 | 3/2000 |

* cited by examiner

*Primary Examiner*—Duc M. Nguyen
*Assistant Examiner*—Michael Thier
(74) *Attorney, Agent, or Firm*—McGinn IP Law Group, PLLC

(57) ABSTRACT

A network access control is performed by using a status management table having a maximum permissible number of entries, which is determined depending on a time-out period predetermined by user terminals and a hardware-setting time required for setting communication resource. When receiving an access start request received from a user terminal, it is determined whether the hardware setting corresponding to the access start request is estimated to be completed within the time-out period. If it is estimated to be completed, the received access start request is registered into the status management table to issue a hardware setting command. If it is estimated not to be completed, an access rejection message is sent back to the user terminal.

12 Claims, 7 Drawing Sheets

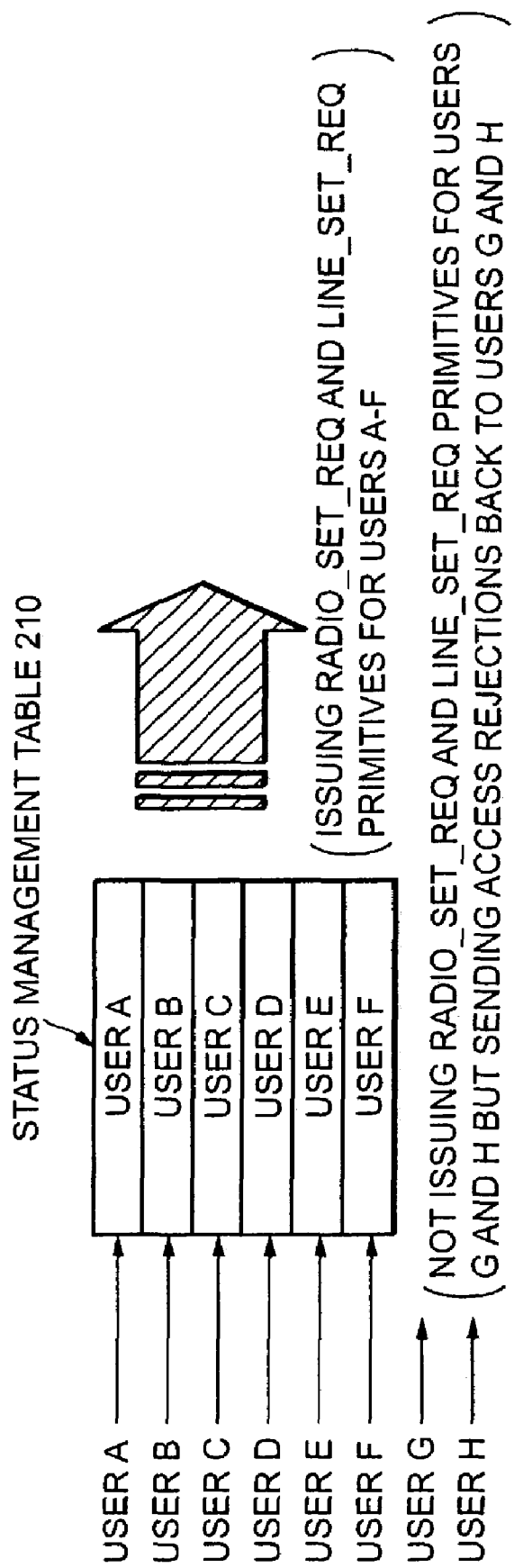

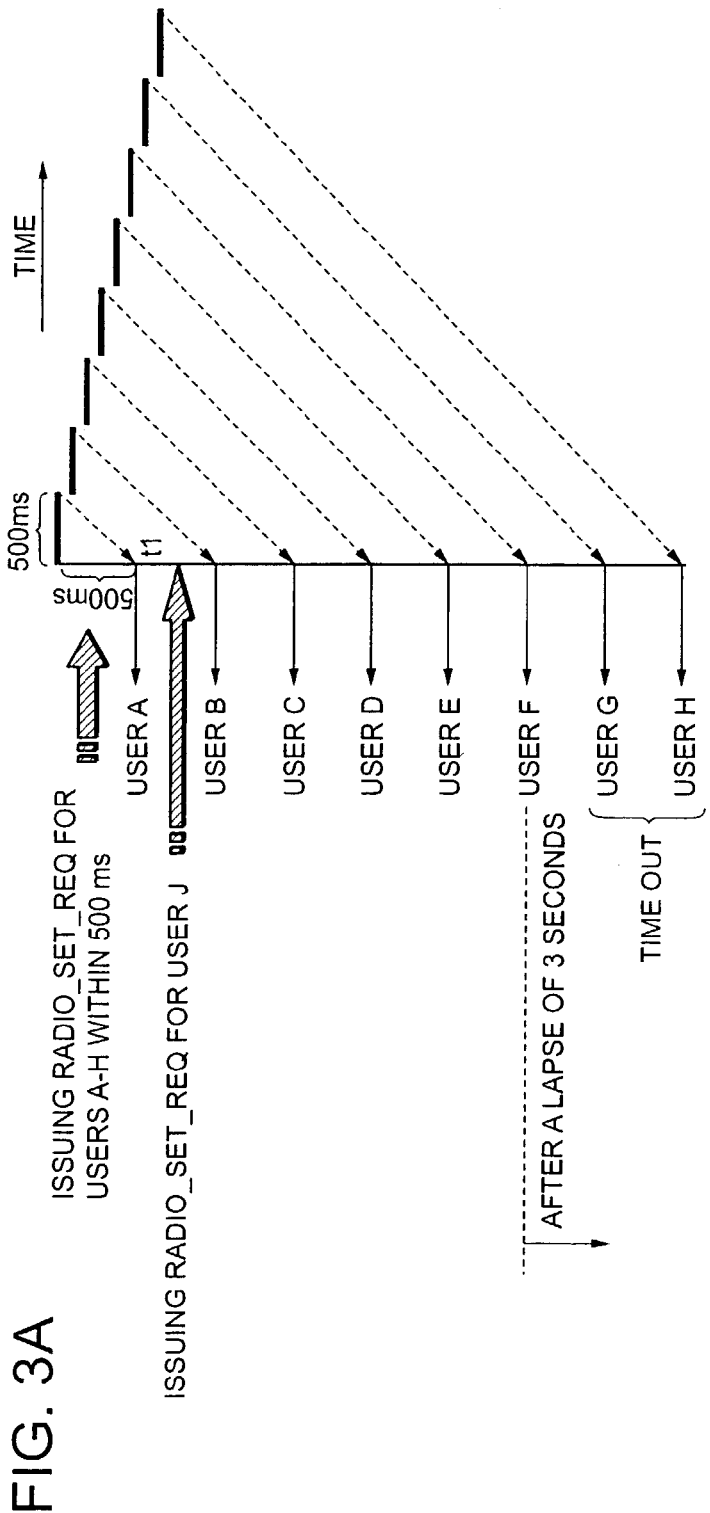

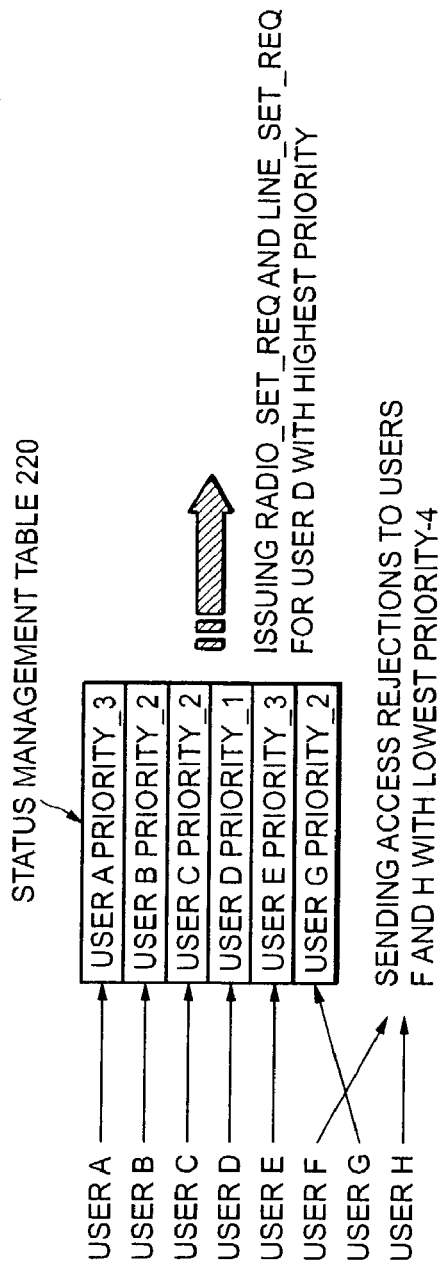
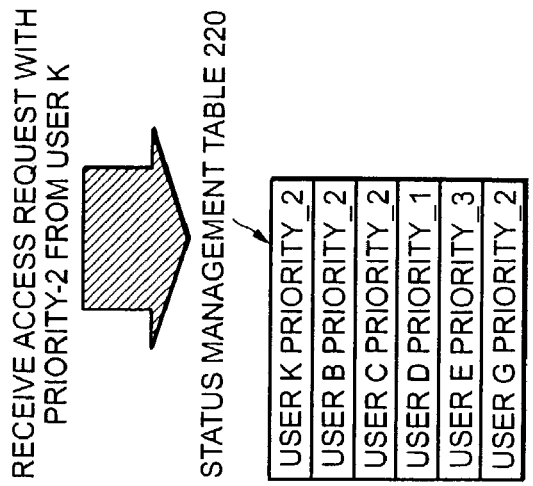
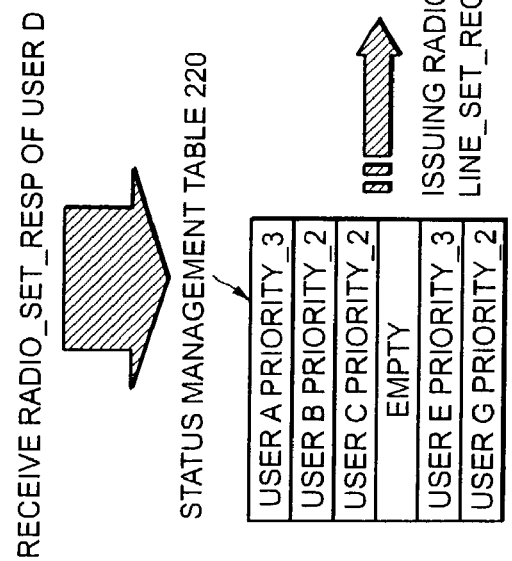

NETWORK ACCESS CONTROL TECHNIQUE IN A CDMA SYSTEM

BACKGROUND OF THE INVENTION

1. Field of the Invention

The present invention relates to a network access control method and apparatus in a code-division multiple access (CDMA) system where a plurality of wireless terminals are allowed to simultaneously access the CDMA mobile communications network.

2. Description of Related Art

In principle, CDMA is not a time-based access system such as time-division multiple access (TDMA). Accordingly, the CDMA system permits a plurality of CDMA terminals to simultaneously send different network access requests to the network on the common channel. Even if different network access requests has been simultaneously received, they can reach the network with high probability or less probability of collision in radio section.

In the CDMA system, however, it is conceivable that instantaneous processing congestions are likely to occur in the network side, compared to the TDMA system. More specifically, radio-system/wired-system hardware settings are needed for each network access request. Accordingly, when a plurality of simultaneous access requests occur within a time period required for the radio-system and wired-system hardware settings, notification of access permission/rejection for a network access request is delayed, resulting in time-out in an originating CDMA terminal. When the time-out occurs, the originating CDMA terminal resends the same network access request to the network. Accordingly, such retransmission of the network access request accelerates the processing congestions in the network side and at worst a system failure may occur.

As described above, when CDMA terminals start network accesses in a CDMA system, the possibility of heavy instantaneous loads on the network may be higher than in the case of a TDMA system. Therefore, it is necessary for the network to increase in processing capacity and efficiently and properly control such access requests of user terminals even when the network is instantaneously overloaded by user terminals starting network accesses.

SUMMARY OF THE INVENTION

An object of the present invention is to provide a network access control method and apparatus allowing efficient and proper network access control even under high instantaneous loads.

According to an aspect of the present invention, 1, a network access control apparatus in a code-division multiple access (CDMA) communications system including a plurality of user terminals, includes: a status management table for managing a status of hardware setting corresponding to an access start request received from a user terminal; and an access controller for registering an access start request received from a user terminal into the status management table to issue a hardware setting command if the hardware setting corresponding to the access start request is estimated to be completed within a time-out period predetermined by the user terminal, and sending an access rejection message to the user terminal if the hardware setting is estimated not to be completed within the time-out period.

According to another aspect of the present invention, a network access control method includes the steps of: a) preparing a status management table having a maximum permissible number of entries, which is determined depending on a time-out period predetermined by the user terminals and a hardware-setting time required for setting communication resource; b) receiving an access start request received from a user terminal; c) when the status management table is not full, registering the received access start request into the status management table to issue a hardware setting command; and d) when the status management table is full, sending an access rejection message to the user terminal.

The network access control method may further include the steps of: e) when a response to the hardware setting command has been received, sending an access start permission message to the user terminal corresponding to the received access start request; f) clearing an entry corresponding to the received access start request from the status management table; and g) returning to the step b).

The step c) may include the steps of: registering the received access start request and its priority into the status management table, the plurality of user terminals having priorities previously assigned thereto; and issuing hardware setting commands each corresponding to entries of the status management table in order of precedence.

The step d) may include the steps of: when the status management table is full, searching the status management table for an entry having a lowest priority; determining whether the priority of the received access start request is higher than the lowest priority of the entry found in the status management table; when the priority of the received access start request is higher than the lowest priority of the entry, clearing the entry from the status management table to register the received access start request into the status management table; sending the access rejection message to a user terminal corresponding to the cleared entry; and when the priority of the received access start request is not higher than the lowest priority of the entry, sending the access rejection message to the user terminal originating the received access start request.

As described above, according to the present invention, the status management table is used to avoid issuing useless primitives and user terminals from resending useless access start requests. Therefore, the congestion of an access control node and the network load can be effectively reduced. Especially an influence on both the network and the access control node caused by user terminals concurrently starting network accesses can be minimized.

BRIEF DESCRIPTION OF DRAWINGS

FIG. 2B is a schematic diagram showing a status management table used in the radio access control node;

FIG. 3A is a time chart showing a network access control operation according to a first embodiment of the present invention;

FIG. 3B is a schematic diagram showing a status management table immediately after Radio_Set_Req has been received for user A;

FIG. 5A is a schematic diagram showing a status management table used in a radio access control node according to a second embodiment of the present invention;

FIG. 5B is a schematic diagram showing the status management table of FIG. 5A immediately after Radio_Set_Req has been received for user D having the highest priority assigned thereto;

FIG. 5C is a schematic diagram showing the status management table of FIG. 5A immediately after an access request having a priority assigned thereto has been received from user K and a lower-priority entry of the status management table has been replaced with the received access request.

DETAILED DESCRIPTION OF THE PREFERRED EMBODIMENTS

Figure 1:
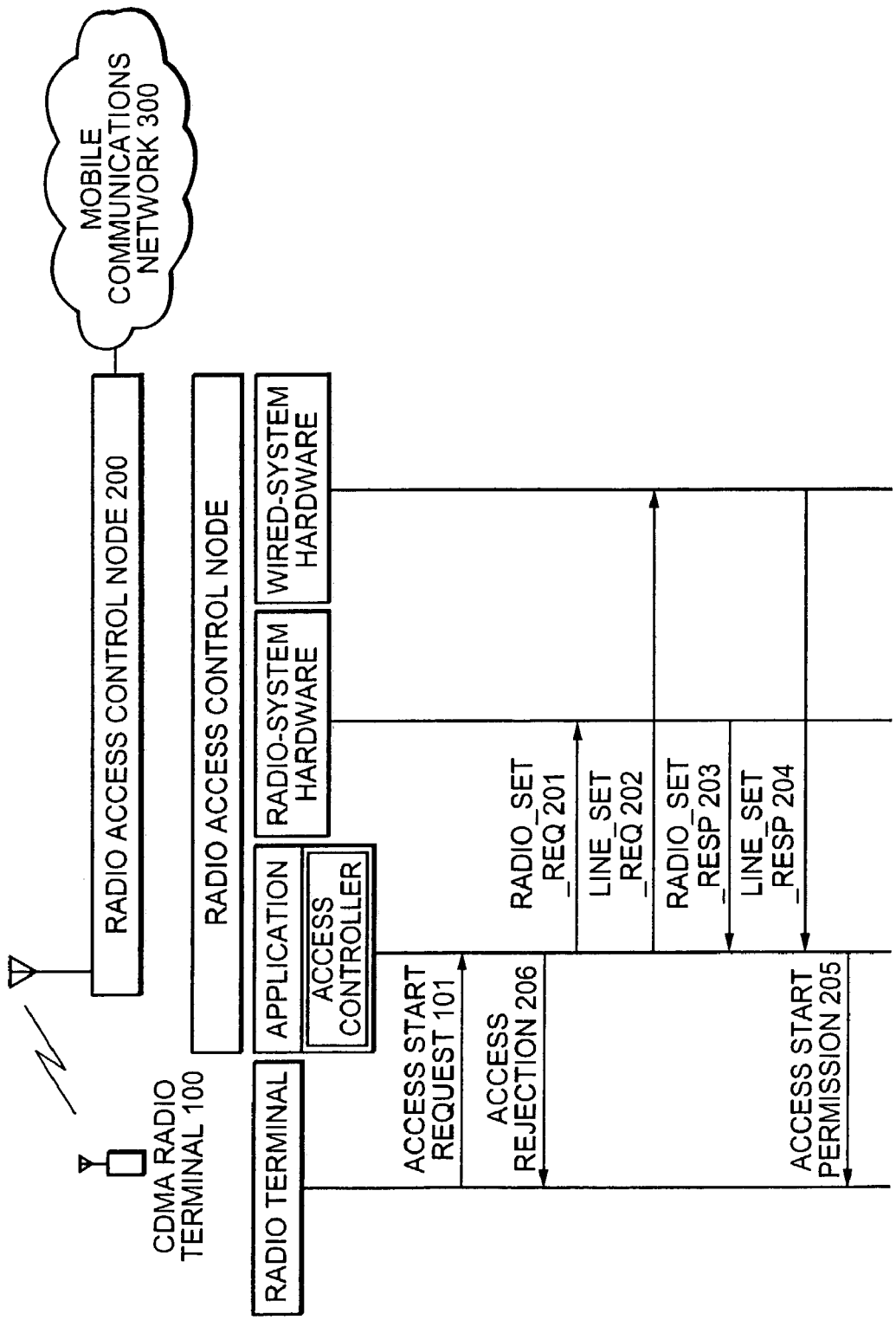
FIG. 1 is a diagram showing a schematic sequence of a network access control operation according to the present invention.

As shown in FIG. 1, it is assumed that a mobile communications system is composed of a CDMA radio terminal 100, a CDMA radio access control node 200 and a mobile communication network 300. The CDMA radio access control node 200 according to the present invention performs setting and management of radio resources, setting and management of wired resources, connection and protocol transformation between a radio section and the mobile communication network 300.

When the CDMA radio access control node 200 has received an access start request from the CDMA radio terminal 100, an access controller on application layer implemented in the CDMA radio access control node 200 detects congestion status of its own node to optimize loads of its own node and determines whether the access request is permitted or rejected.

When it is determined that the access start request of the CDMA radio terminal 100 is permitted, the access controller issues a Radio_Set_Req primitive 201 for setting radio resource to radio-system hardware and a Line_Set_Req primitive 202 for setting wired resource to wired-system hardware. A primitive is a command for executing settings between layers in radio-system/wired-system hardware. The radio-system hardware performs radio-resource settings such as radio channel setting and spreading code setting so as to enable radio communication and, when the radio-resource setting has been normally completed, sends a Radio_Set_Resp primitive 203 back to the access controller. Similarly, the wired-system hardware performs wired-resource settings such as, in the case of ATM (Asynchronous Transfer Mode), VP (virtual path) and VC (virtual channel) settings and, when the wired-resource setting has been normally completed, sends a Line_Set_Resp primitive 204 back to the access controller.

When the access controller has received the Radio_Set_Resp primitive 203 and the Line_Set_Resp primitive 204 from the radio-system hardware and the wired-system hardware, respectively, the access controller sends an access start permission message 205 as a response to the access start request 101 to the CDMA radio terminal 100 by radio.

When the access controller detects congestion status of its own node, the access controller determines that the access start request of the CDMA radio terminal 100 is rejected. In this rejection case, the access controller sends an access rejection message 206 to the CDMA radio terminal 100 without issuing any primitives to radio-system/wired-system hardware.

First Embodiment

Figure 2A:
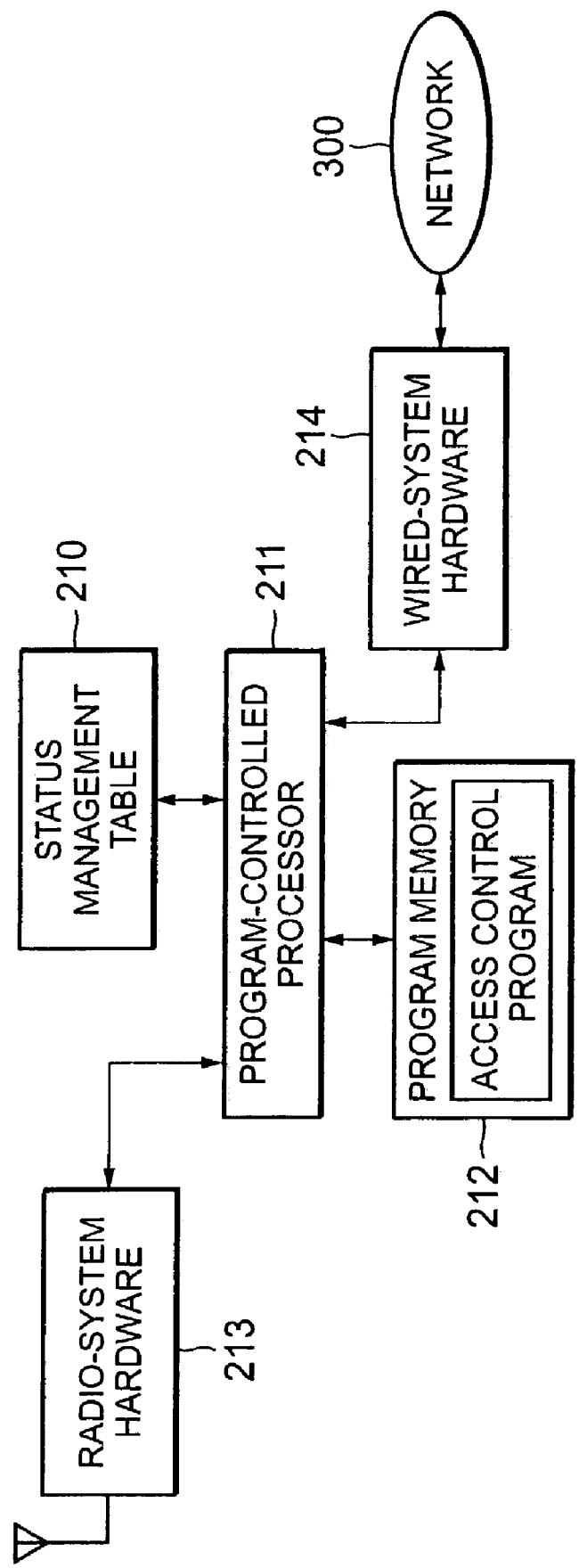
FIG. 2A is a schematic block diagram showing a radio access control node according to the present invention.

Referring to FIG. 2A, the CDMA radio access control node 200 according to a first embodiment of the present invention has a hardware structure including a status management table 210, a program-controlled processor 211, a program memory 212, the radio-system hardware 213, and the wired-system hardware 214. The program memory 212 stores an access control program, which runs on the program-controlled processor 211 to perform the network access control operation according to the present embodiment. The status management table 210 may be created in a random access memory (not shown) in the CDMA radio access control node 200.

Referring to FIG. 2B, the status management table 210 manages received user's access requests whose radio/wired-resource setting operations are not completed, in other words, the above request primitives have been already sent but no response primitives received.

In the present embodiment, the status management table 210 can contain a predetermined number of entries, which is the maximum number of simultaneously operable primitives. The maximum number is calculated from the hardware-setting time required to set hardware for a single primitive and the time-out period, or response waiting time, of a CDMA radio terminal. Accordingly, the status management table 210 can manage the maximum number of user's access requests.

In normal times, the time required for processing a Radio_Set_Req primitive 201 or a Line_Set_Req primitive 202 can be determined to some extent fixedly. Therefore, the maximum number of simultaneously operable primitives is calculated by $T_{RS}/T_{PP}$, where $T_{RS}$ is a time-out period of the CDMA radio terminal and $T_{PP}$ is a hardware-setting time for a single hardware-setting request primitive. Any further issuing of primitives cannot obtain a response within the time-out period of a corresponding CDMA radio terminal. Therefore, the access controller sends an access rejection message back to the corresponding CDMA radio terminal.

Alternatively, the maximum number of simultaneously operable primitives in the status management table 210 may be controlled by the access controller calculating $T_{RS}/T_{PP}$.

Next, a typical operation of the present embodiment will be described with reference to FIGS. 2B, 3A and 3B.

In FIG. 3A, the followings are assumed:

the radio-system hardware setting time for the Radio_Set_Req primitive 201 is 500 msec;

the wired-system hardware setting time for the Line_Set_Req primitive 202 is shorter than the radio-system hardware setting time;

eight (8) user terminals A-H send network access start requests 101 to the CDMA radio access control node 200 within 500 msec; and each user terminal resends a network access start request to the CDMA radio access control node 200 if an access start permission/rejection message is not received 3 seconds or fewer after the network access start request has been sent.

As shown in FIG. 3A, since it takes 500 msec to complete hardware setting for each user's access request, the user terminal A waits about 500 msec to receive an access start permission message for a corresponding hardware-setting completion primitive (Radio_Set_Resp 203), the user terminal B waits about 1 second, the user terminal C waits about 1.5 sec, . . . , and the user terminal F waits about 3 seconds.

However, the user terminal G waits about 3.5 seconds and the user terminal H waits about 4 seconds, resulting in that their time-out periods have already elapsed. Accordingly, the user terminals G and H have resent network access start requests to the CDMA radio access control node 200 before receiving access start permission messages, which will cause a congestion state of the CDMA radio access control node 200 to be accelerated as described before. In order to avoid such resending of network access start requests, the status management table 210 as shown in FIG. 2B is introduced.

As described before, the status management table 210 can contain a predetermined number of simultaneously operable primitives, which is calculated by $T_{RS}/T_{PP}$, where $T_{RS}$ is a time-out period (here, 3 seconds) of each CDMA radio terminal and $T_{PP}$ is a hardware-setting time (here, 500 msec) for a radio-hardware setting request primitive. Therefore, the status management table 210 can register up to 6 (=3(sec)/500(msec)) entries because further received access requests are estimated not to be completely processed within the time-out period of 3 seconds.

As in the case of FIG. 3A, when 8 user terminals A-H send network access start requests 101 to the CDMA radio access control node 200 within 500 msec, the first 6 requests of user terminals A-F are registered into the status management table 210. At the same time, the access controller issues the Radio_Set_Req primitive 201 and the Line_Set_Req primitive 202 for each registered request. As for the last two requests of user terminals G and H, the access controller sends the access rejection message 206 to each of the user terminals G and H.

When 500 msec has elapsed, the access controller receives the Radio_Set_Resp primitive 203 for the user terminal A from the radio-system hardware and sends the access start permission message 205 to the user terminal A. At the same time, the entry of the user A is cleared from the status management table 210 as shown in FIG. 3B. In this manner, each time the Radio_Set_Resp primitive 203 for each user terminal has been sent to a corresponding user terminal, a corresponding entry is cleared from the status management table 210.

If a user terminal J sends a network access start request 101 to the CDMA radio access control node 200 at time instant t1 as shown in FIG. 3A, the request of the user terminal J is registered into the status management table 210 as long as there is a space in the status management table 210. At the same time, the Radio_Set_Req primitive 201 and the Line_Set_Req primitive 202 are issued to the respective hardware. As for the user terminal J, it is estimated that the user J waits about 2.5 seconds to receive the access start permission message 205 caused by the Radio_Set_Resp primitive 203. In this manner, a further received network access start request can be registered into the status management table 210 as long as there is a space in the status management table 210 because the further received access request is estimated to be completely processed within the time-out period of 3 seconds.

As described before, the access controller on the application layer is created by running the access control program on the program-controlled processor 211. The details of the access control operation will be described hereinafter.

Figure 4:
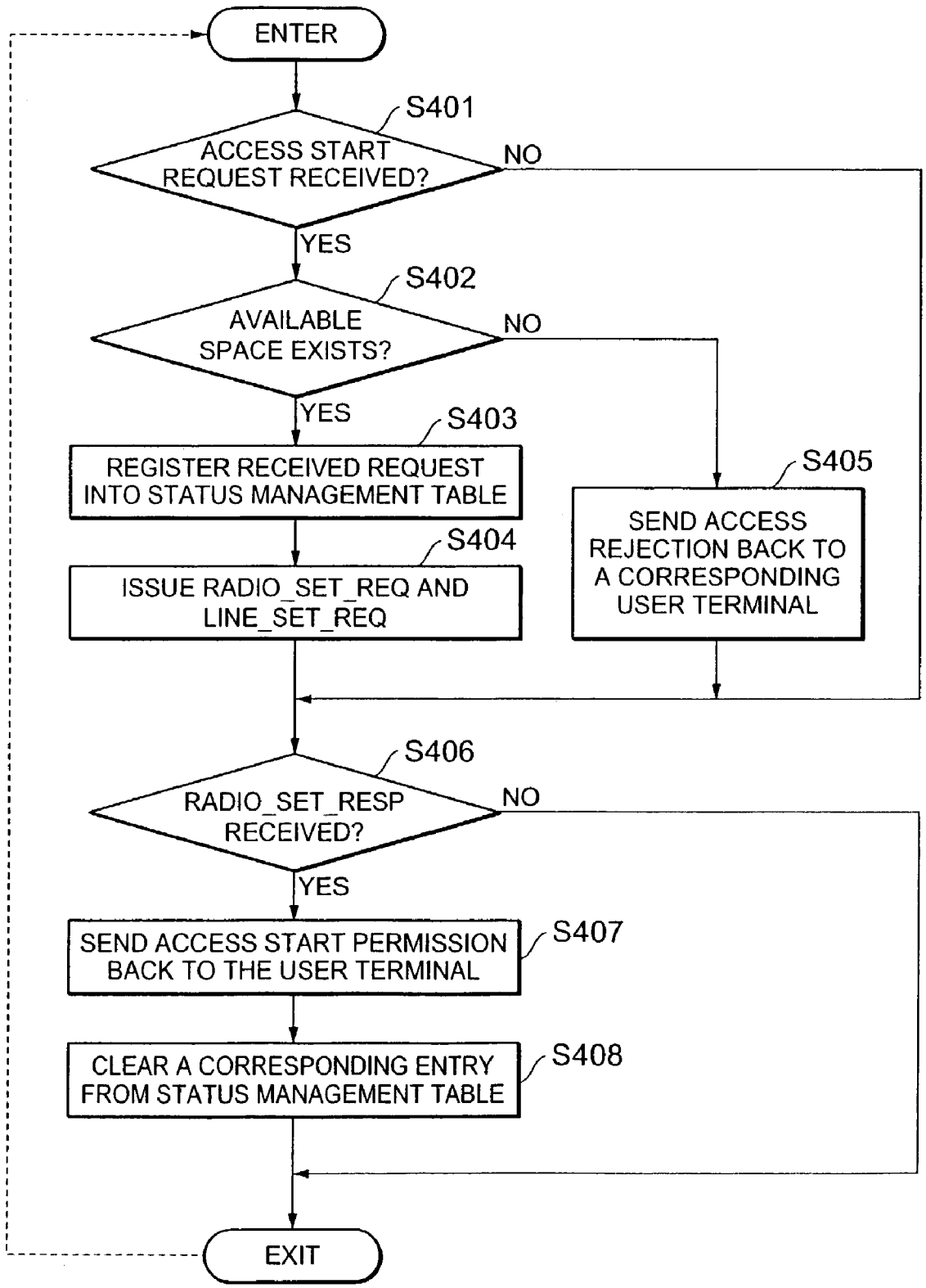
FIG. 4 is a flow chart showing the network access control operation according to the first embodiment.

Referring to FIG. 4, it is determined whether at least one access start request is received (step S401). When at least one access start request is received (YES in step S401), the access controller determines whether there is an available space in the status management table 210 (step S402). When an available space exists in the status management table 210 (YES in step S402), the access controller registers the received request into the status management table 210 (step S403) and, at the same time, issues the Radio_Set_Req primitive 201 and the Line_Set_Req primitive 202 to the radio-system hardware and the wired-system hardware, respectively (step S404)

When there is no available space in the status management table 210 (NO in step S402), it means that a further received access start request cannot be completely processed within 3 seconds. Therefore, the access controller sends an access rejection message back to the user terminal which has sent the received access start request (step S405).

After having sent an access rejection message or issued the primitives or when no access start request is received, the access controller determines whether a Radio_Set_Resp primitive 203 is received from the radio-system hardware (step S406). When a Radio_Set_Resp primitive 203 has been received (YES in step S406), the access controller sends an access start permission message to the user terminal which has sent the received access start request (step S407) and clears a corresponding entry from the status management table 210 (step S408).

The steps S401-S408 are repeatedly performed at regular intervals. As described before, when an entry has been cleared from the status management table 210 (step S408), there is developed an empty space in the status management table 210 as shown in FIG. 3B. Accordingly, when an access start request is received in that table status, it can be registered into the status management table 210 (step S403).

Second Embodiment

According to a second embodiment of the present invention, the access control is performed using priorities which are previously assigned to respective ones of CDMA radio terminals.

Referring to FIGS. 5A-5C, a CDMA radio access control node 200 according to a second embodiment of the present invention includes a status management table 220, which manages received access start requests while looking at the priorities thereof.

In the present embodiment, the status management table 220 can contain a predetermined number of entries, which is the maximum number of simultaneously operable primitives as in the case of the first embodiment. Each entry of the status management table 220 includes a user identifier and its priority. As shown in FIG. 5A, the user terminal A is given a priority of 3, the user terminal B a priority of 2 which is higher than the priority of 3, and so on. In this example, the user terminal D is given the highest priority of 1 and the user terminals F and H are given the lowest priority of 4.

When the user terminals A-H having priorities assigned as shown in FIG. 5A send network access start requests 101 to the CDMA radio access control node 200 within 500 msec, the access controller registers them into the status management table 220 in order of precedence. In this example, the higher-priority six requests of the user terminals A-E and G are registered into the status management table 210. As for the lowest-priority requests of the user terminals F and H, the access controller does not register them but send the access rejection message 206 to each of the user terminals F and H.

Thereafter, the access controller selects a highest-priority one from the registered requests to issue the Radio_Set_Req primitive 201 and the Line_Set_Req primitive 202. In the status as shown in FIG. 5A, the highest-priority request of the user terminal D is selected to issue the request primitives. However, the request primitives related to other user terminals are not issued.

As shown in FIG. 5B, when the access controller confirms that the response primitive Radio_Set_Resp for the user terminal D has been received, the access controller selects the second highest-priority request of the user terminal B to issue the request primitives. At the same time, the entry of the user terminal D is cleared from the status management table 220 and the access start permission message 205 is sent to the user terminal D.

As shown in FIG. 5C, it is assumed that a new access request 101 of a user terminal K has been received in such a state that the status management table 220 is full, the user terminal K having a priority of 2 higher than some entry in the status management table 220. In this case, the entry of the user terminal A having the lowest one of priorities lower than the priority of 2 is deleted from the status management table 220 and the access request of the user terminal K is registered into the status management table 220. The access start rejection message is sent to the user terminal A that has been deleted from the status management table 220.

As described before, the access controller on the application layer is created by running the access control program on the program-controlled processor 211. The details of the access control operation will be described hereinafter.

Figure 6:
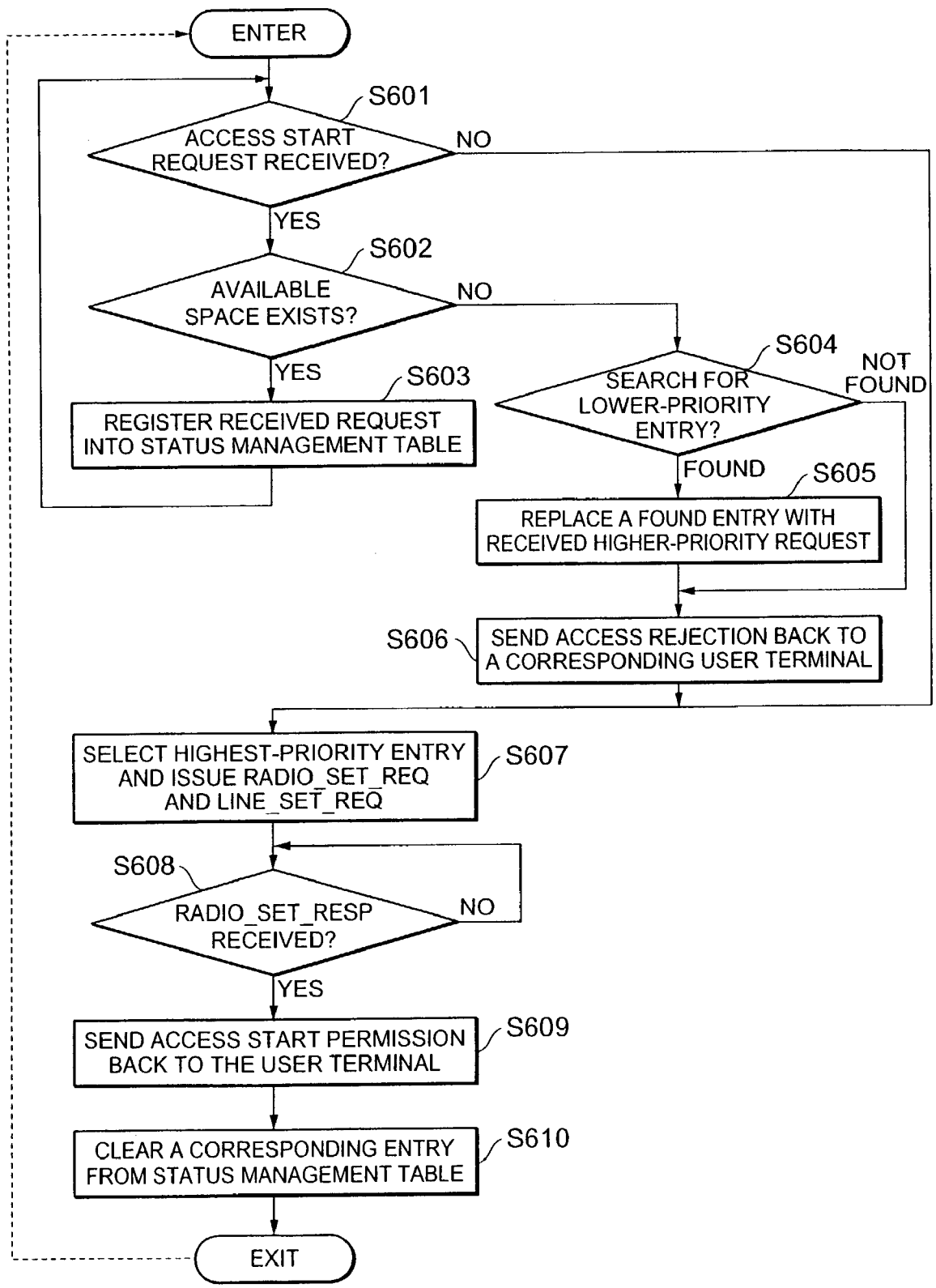
FIG. 6 is a flow chart showing the network access control operation according to the second embodiment.

Referring to FIG. 6, it is determined whether at least one access start request is received (step S601). When at least one access start request is received (YES in step S601), the access controller determines whether there is an available space in the status management table 220 (step S602). When an available space exists in the status management table 220 (YES in step S602), the access controller registers the received access request and its priority of the originating user terminal into the status management table 220 (step S603).

When there is no available space in the status management table 220 (NO in step S602), the access controller searches the status management table 220 for an entry having the lowest priority which is lower than the priority of the received access request (step S604). If such a lowest-priority entry is found, the access controller replaces the found entry with the received access request (step S605) and sends the access rejection message back to a user terminal corresponding to the lowest-priority entry (step S606). If such a lowest-priority entry is not found, the access controller sends the access rejection message back to a user terminal originating the received access start request (step S606).

After having sent an access rejection message (step S606) or when no access start request is received (NO in step S601), the access controller selects the highest-priority entry from the status management table 220 to issue the Radio_Set_Req primitive 201 and the Line_Set_Req primitive 202 (step S607). Thereafter, the access controller waits a Radio_Set_Resp primitive 203 to be received from the radio-system hardware (step S608). When a Radio_Set_Resp primitive 203 has been received (YES in step S608), the access controller sends an access start permission message to the user terminal which has sent the received access start request (step S609) and clears a corresponding entry from the status management table 220 (step S610).

The steps S601-S610 are repeatedly performed at regular intervals. As described before, when an entry has been cleared from the status management table 220 (step S610), there is developed an empty space in the status management table 220 as shown in FIG. 5B. Accordingly, when a new access start request is received in that table status, it can be registered into the status management table 220 (step S603). In addition, since the access controller selects the highest-priority entry from the status management table 220 to issue the request primitives (step S607), the entries of the status management table 220 are sequentially selected in order of precedence.

The invention claimed is:

1. A network access control apparatus in a code-division multiple access (CDMA) communications system including a plurality of user terminals, said control apparatus comprising:
   a status management table for managing a status of hardware setting corresponding to an access start request received from a user terminal; and
   an access controller for registering an access start request received from a user terminal into the status management table to issue a hardware setting command if the hardware setting corresponding to the access start request is estimated to be completed within a time-out period predetermined by the user terminal, and sending an access rejection message to the user terminal if the hardware setting is estimated not to be completed within the time-out period.

2. The network access control apparatus according to claim 1, wherein the access controller clears an entry of the access start request from the status management table when having received a response indicating hardware-setting completion.

3. The network access control apparatus according to claim 1, wherein:
   the access controller registers an access start request received from a user terminal and its priority into the status management table, the plurality of user terminals having priorities previously assigned thereto; and
   the access controller issues hardware setting commands each corresponding to entries of the status management table in order of precedence.

4. The network access control apparatus according to claim 2, wherein:
   the access controller registers an access start request received from a user terminal and its priority into the status management table, the plurality of user terminals having priorities previously assigned thereto; and
   the access controller issues hardware setting commands each corresponding to entries of the status management table in order of precedence.

5. The network access control apparatus according to claim 3, wherein, when a new access start request has been received, which has a priority higher than a lowest priority of the status management table, the access controller clears a corresponding entry having the lowest priority from the status management table and registers the new access start request into the status management table, wherein the access controller sends an access rejection message to a user terminal of the corresponding entry having the lowest priority.

6. The network access control apparatus according to claim 4, wherein, when a new access start request has been received, which has a priority higher than a lowest priority of the status management table, the access controller clears a corresponding entity having the lowest priority from the status management table and registers the new access start request into the status management table, wherein the access controller sends an access rejection message to a user terminal of the corresponding entry having the lowest priority.

7. A network access control method in a code-division multiple access (CDMA) communications system including a plurality of user terminals, comprising the steps of:
   a) preparing a status management table having a maximum permissible number of entries, which is determined depending on a time-out period predetermined by the user terminals and a hardware-setting time required for setting communication resource;

b) receiving an access start request received from a user terminal;

c) when the status management table is not full, registering the received access start request into the status management table to issue a hardware setting command; and d) when the status management table is full, sending an access rejection message to the user terminal.

8. The network access control method according to claim 7, further comprising the steps of:

e) when a response to the hardware setting command has been received, sending an access start permission message to the user terminal corresponding to the received access start request;

f) clearing an entry corresponding to the received access start request from the status management table; and g) returning to the step b).

9. The network access control method according to claim 7, wherein the step c) comprises the steps of:

registering the received access start request and its priority into the status management table, the plurality of user terminals having priorities previously assigned thereto; and issuing hardware setting commands each corresponding to entries of the status management table in order of precedence.

10. The network access control method according to claim 7, wherein the step d) comprises the steps of:

when the status management table is full, searching the status management table for an entry having a lowest priority;

determining whether the priority of the received access start request is higher than the lowest priority of the entry found in the status management table;

when the priority of the received access start request is higher than the lowest priority of the entry, clearing the entry from the status management table to register the received access start request into the status management table;

sending the access rejection message to a user terminal corresponding to the cleared entry; and when the priority of the received access start request is not higher than the lowest priority of the entry, sending the access rejection message to the user terminal originating the received access start request.

11. The network access control apparatus according to claim 1, wherein said status management table can contain a predetermined number of simultaneously operative primitives.

12. The network access control apparatus according to claim 11, wherein said predetermined number comprises $(T_{RS}/T_{PP})$, where $T_{PP}$ comprises a hardware-setting time of a radio-hardware setting request primitive, where $T_{RS}$ comprises a time-out period of said plurality of CDMA terminals, and wherein $T_{pp}$ and $T_{RS}$ comprise a relationship such that $(0<T_{PP}<T_{RS})$.

* * * * *